United States Patent
Sawada et al.

(10) Patent No.: US 10,858,984 B2
(45) Date of Patent: Dec. 8, 2020

(54) COMBUSTION SYSTEM AND METHOD OF USING FUEL COMPOSITION AS FUEL FOR REMODELED DIESEL ENGINE

(71) Applicants: Shigemi Sawada, New Taipei (TW);
Masahiro Tachi, New Taipei (TW);
Hua-Shu Chang, New Taipei (TW)

(72) Inventors: Shigemi Sawada, New Taipei (TW);
Masahiro Tachi, New Taipei (TW)

(73) Assignees: Shigemi Sawada, New Taipei (TW);
Masahiro Tachi, New Taipei (TW);
Hua-Shu Chang, New Taipei (TW)

( * ) Notice: Subject to any disclaimer, the term of this patent is extended or adjusted under 35 U.S.C. 154(b) by 0 days.

(21) Appl. No.: 16/401,460

(22) Filed: May 2, 2019

(65) Prior Publication Data

US 2020/0072120 A1     Mar. 5, 2020

(30) Foreign Application Priority Data

Aug. 31, 2018     (TW) .............................. 107130483 A

(51) Int. Cl.
*F02B 23/06*     (2006.01)
*F02F 3/12*      (2006.01)
*F02F 1/24*      (2006.01)

(52) U.S. Cl.
CPC ............ *F02B 23/0603* (2013.01); *F02F 1/24* (2013.01); *F02F 3/12* (2013.01); *F02B 2023/0606* (2013.01)

(58) Field of Classification Search
CPC .......... F02B 23/0603; F02B 2023/0606; F02B 47/02; F02F 1/24; F02F 3/12; C10L 1/08;
(Continued)

(56) References Cited

U.S. PATENT DOCUMENTS

| 6,302,929 B1 * | 10/2001 | Gunnerman | C10L 1/328 44/302 |
| 2012/0102822 A1 * | 5/2012 | Holcomb | B01J 13/0026 44/301 |
| 2014/0182549 A1 * | 7/2014 | Cleeves | F02M 25/03 123/429 |

FOREIGN PATENT DOCUMENTS

| CN | 1147830 | 4/1997 |
| JP | 2004225570 | 8/2004 |

(Continued)

OTHER PUBLICATIONS

Detailed description machine translation, JP2004225570(A), Sawada, obtained from https://worldwide.espacenet.com/, pp. 1-3. (Year: 2004).*

(Continued)

*Primary Examiner* — Grant Moubry
(74) *Attorney, Agent, or Firm* — Burris Law, PLLC

(57) ABSTRACT

A combustion system includes a remodeled diesel engine and a fuel composition to be added into the remodeled diesel engine. The remodeled diesel engine includes a cylinder unit, and a coating coated on the cylinder unit and containing a catalyst that is a metal, an alloy of the metal, a composite containing oxides of the metal, a salt of the metal or combinations thereof. The metal is platinum, nickel, cobalt, copper, molybdenum, and/or titanium. The fuel composition includes water, a fuel oil and an emulsifying agent. The amount of water ranges from 10 to 90 wt % based on total weight of water and the fuel oil, and the amount of the emulsifying agent ranges from 0.5 to 10 wt % relative to total weight of water and the fuel oil.

6 Claims, 1 Drawing Sheet

(58) Field of Classification Search
CPC .......... C10L 1/32; C10L 1/125; C10L 1/1926; C10L 1/191; C10L 2230/22; C10L 2250/082

See application file for complete search history.

(56) References Cited

FOREIGN PATENT DOCUMENTS

| | | |
|---|---|---|
| JP | 2013091056 | 5/2013 |
| TW | 200815584 | 4/2008 |

OTHER PUBLICATIONS

Search Report dated Nov. 27, 2018 in corresponding TW Application 107130483.

\* cited by examiner

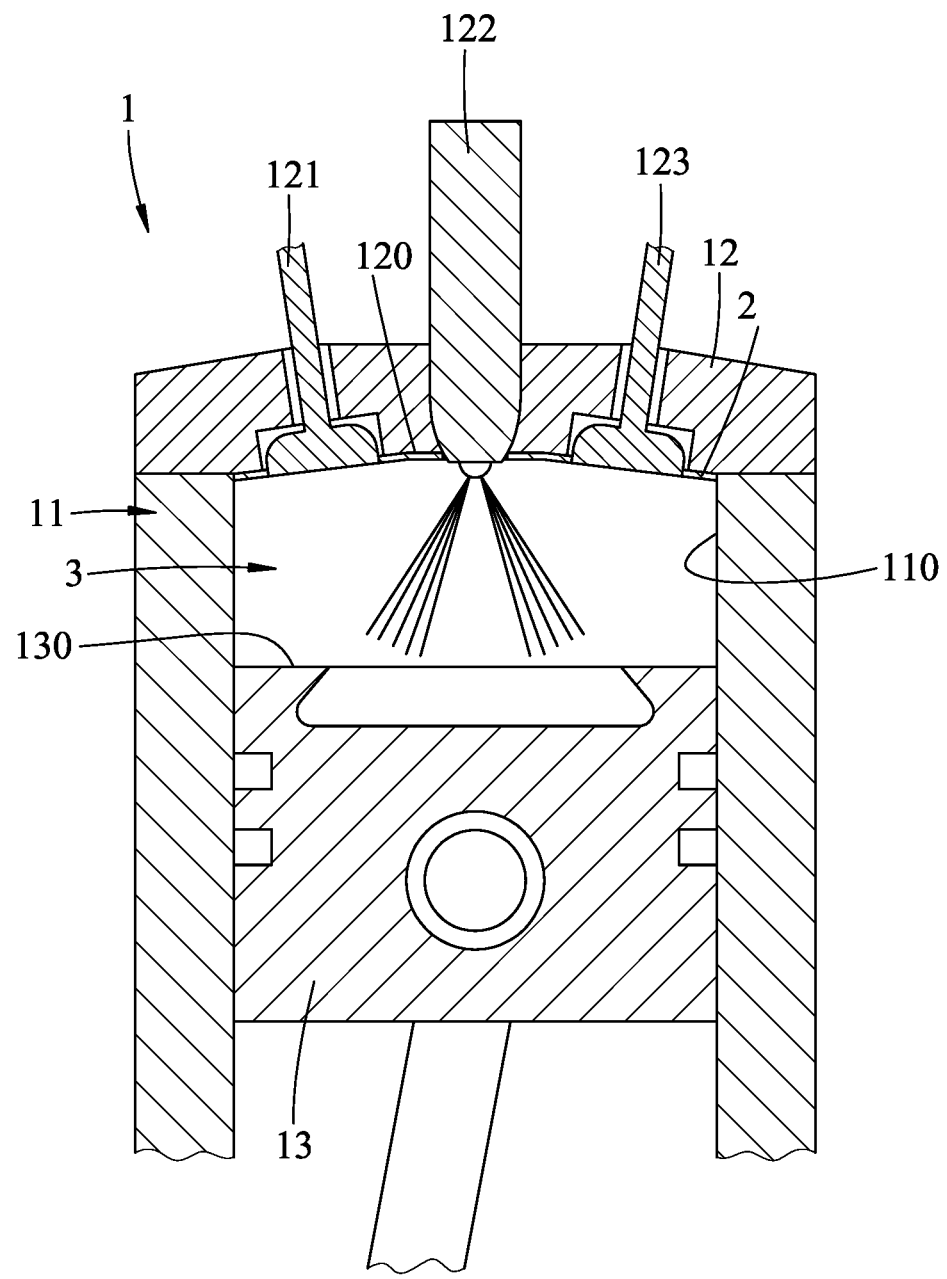

COMBUSTION SYSTEM AND METHOD OF USING FUEL COMPOSITION AS FUEL FOR REMODELED DIESEL ENGINE

CROSS-REFERENCE TO RELATED APPLICATION

This application claims priority of Taiwanese Invention Patent Application No. 107130483, filed on Aug. 31, 2018.

FIELD

The disclosure relates to a combustion system including a remodeled diesel engine and a fuel composition to be added into the remodeled diesel engine. The disclosure also relates to a method of improving performance of the remodeled diesel engine by virtue of the fuel composition.

BACKGROUND

While the usage of fuel-efficient hybrid vehicles and electric vehicles gradually increases in recent years, a similar trend has been reported for internal combustion diesel engine vehicles.

When the internal combustion diesel engine is operated by subjecting fuel to explosive combustion, toxic pollutants including nitrogen oxides ($NO_x$) and particle matters (PM), as well as unburned or incompletely burned hydrocarbon (HC) would be inevitably produced and remained in the resultant combustion exhaust gases because of incomplete combustion of the fuel. In order to reduce the production of these toxic pollutants during the operation of the diesel engine, Japanese Patent Application Publication No. JP 2004-225570 discloses formation of a catalyst (such as nickel) film on an inner surface of a cylinder wall, an inner surface of a cylinder head, and an upper surface of a piston, so that the catalyst film would contact the fuel in a combustion chamber within the cylinder. By reacting with the catalyst film, the $NO_x$ in the combustion exhaust gas can be converted into harmless nitrogen and oxygen gases, HC can be converted into water and carbon dioxide, and amount of the PM can be reduced.

However, the applicants found that, when conventionally used petroleum oil (such as light oil) serves as fuel of the diesel engine as disclosed in JP 2004-225570, the amount of the toxic pollutants in the exhaust gas was relatively high and the fuel efficiency was unsatisfactory.

Japanese Patent Application Publication No. JP 2013-091056 discloses a method of removing nitrogen oxides in combustion exhaust gas, which includes reacting the combustion exhaust gas with water containing active hydrogen. The active hydrogen is generated using magnesium and an acid. It has been shown that 70 wt % of nitrogen oxides can be removed from the combustion exhaust gas, indicating the water containing active hydrogen is effective for decomposing the $NO_x$. In this Japanese application, the combustion exhaust gas generated in a combustion chamber is introduced into a reaction vessel to react with the water containing active hydrogen.

SUMMARY

Therefore, a first object of the disclosure is to provide a combustion system that can alleviate at least one of the drawbacks of the prior art.

According to this disclosure, the combustion system includes a remodeled diesel engine and a fuel composition to be added into the remodeled diesel engine.

The remodeled diesel engine includes a cylinder unit defining a combustion chamber, and a coating coated on the cylinder unit and facing the combustion chamber. The coating contains a catalyst that is selected from the group consisting of a metal, an alloy of the metal, a composite containing oxides of the metal, a salt of the metal and combinations thereof, in which the metal is selected from the group consisting of platinum, nickel, cobalt, copper, molybdenum, titanium and combinations thereof.

The fuel composition, which is to be added into the combustion chamber of the remodeled diesel engine, includes water, a fuel oil and an emulsifying agent.

Based on 100 wt % of the combination of the water and the fuel oil, the water is present in an amount ranging from 10 wt % to 90 wt %, and the fuel oil is present in an amount ranging from 90 wt % to 10 wt %.

The emulsifying agent is present in an amount ranging from 0.5 wt % to 10 wt % relative to the 100 wt % of the combination of the water and the fuel oil.

A second object of the disclosure is to provide a method of improving performance of a remodeled diesel engine, including: providing the above-mentioned remodeled diesel engine, and adding the aforesaid fuel composition into the remodeled diesel engine.

A third object of the disclosure is to provide use of the aforesaid fuel composition to improve performance of the above-mentioned remodeled diesel engine.

A fourth object of the disclosure is to provide a method of using the aforesaid fuel composition as a fuel for the above-mentioned remodeled diesel engine, the method including applying the fuel composition to the remodeled diesel engine.

BRIEF DESCRIPTION OF THE DRAWING

Other features and advantages of the disclosure will become apparent in the following detailed description of the embodiment(s) with reference to the accompanying drawing, of which:

FIG. 1 is a sectional view illustrating an embodiment of an internal combustion diesel engine according to the disclosure.

DETAILED DESCRIPTION

It is to be understood that, if any prior art publication is referred to herein, such reference does not constitute an admission that the publication forms a part of the common general knowledge in the art, in Taiwan or any other country.

For the purpose of this specification, it will be clearly understood that the word "comprising" means "including but not limited to", and that the word "comprise(s)" has a corresponding meaning.

Unless defined otherwise, all technical and scientific terms used herein have the meaning commonly understood by a person skilled in the art to which this invention belongs. One skilled in the art will recognize many methods and materials similar or equivalent to those described herein, which could be used in the practice of the present invention. Indeed, the present invention is in no way limited to the methods and materials described.

The present disclosure provides a combustion system including a remodeled diesel engine and a fuel composition to be added into the remodeled diesel engine, i.e., use of the fuel composition as a fuel for the remodeled diesel engine. The fuel composition includes water, a fuel oil and an emulsifying agent. In certain embodiments, the fuel composition consists essentially of water, the fuel oil and the emulsifying agent. In an exemplary embodiment, the fuel composition is composed of water, the fuel oil and the emulsifying agent.

The fuel composition of this disclosure may be used to effectively improve performance of the remodeled diesel engine. Therefore, the present disclosure also provides a method of improving performance of the remodeled diesel engine, including: providing the remodeled diesel engine, and adding the fuel composition to the remodeled diesel engine.

According to this disclosure, the improvement of the performance of the remodeled diesel engine may be determined by, e.g., one or more of: a reduction in emissions of a pollutant in the exhaust gas, and an improvement in fuel efficiency.

Examples of the pollutant may include, but are not limited to, nitrogen oxides ($NO_x$), unburned or incompletely burned hydrocarbons (HC), particulate matters (PM) and combinations thereof.

As used herein, the term "fuel efficiency" refers to the efficiency with which the chemical potential energy contained in a fuel is converted to thermal energy (e.g., heat), kinetic energy, electric power and/or work in the chemical transformation undergone by the fuel (e.g., combustion of the fuel in an internal combustion diesel engine to generate kinetic energy and/or work, combustion of the fuel in an external combustion diesel engine to provide work and/or electricity, or combustion of the fuel in a diesel oil boiler to generate hot steam for keeping worm). For example, the fuel efficiency may be measured by techniques identifiable to a skilled person, such as measurement of the amount of work or heat performed by the chemical transformation of the fuel (e.g., measuring the distances (e.g., miles or kilometers) of travel that the internal combustion diesel engine can provide, the amount (e.g., J or calorie) of work or heat that the external combustion diesel energy can provide, or the volume of hot steam for keeping warm which the diesel oil boiler can generate when combusting a given volume (gallons or liters) of fuel).

In certain embodiments, the fuel composition is prepared by adding the fuel oil into a mixture of the water and the emulsifying agent. Since the emulsified fuel (i.e., water-emulsified fuel) is a non-corrosive aqueous solution, the fuel composition of this disclosure would not corrode a combustion chamber of the remodeled diesel engine.

According to this disclosure, the fuel oil may be a conventional petroleum product, which can serve as a fuel of the remodeled diesel engine. Examples of the fuel oil suitable for use in this disclosure may include, but are not limited to, heavy oil, light oil, kerosene, diesel fuel, and combinations thereof.

According to this disclosure, the emulsifying agent may be any substance capable of rendering the fuel oil miscible with the water. Examples of the emulsifying agent suitable for use in this disclosure may include one or more of the following substances:

(1) amphiphilic compounds, such as an organic base having strong base function groups (high basicity), e.g., magnesium alkylbenzene sulfonate having C3 to C20 alkyl group; and (2) a composition including a lipophilic compound (e.g. sorbitan esters (also known as Spans) and a hydrophilic compound (e.g. polysorbates (also known as Tweens)), such as a mixture of Span 80 and Tween 80 (at a weight ratio of 1:1), or a mixture of Span 80 and Tween 60 (at a weight ratio of 1:1).

In certain embodiments, based on 100 wt % of the combination of the water and the fuel oil, the fuel composition includes 10 wt % to 90 wt % of the water. In other embodiments, the water is present in an amount ranging from 10 wt % to 50 wt %, based on 100 wt % of the combination of the water and the fuel oil.

In certain embodiments, the fuel composition includes 0.5 wt % to 10 wt % of the emulsifying agent relative to 100 wt % of the combination of the water and the fuel oil. In other embodiments, the emulsifying agent is present in an amount ranging from 0.5 wt % to 2 wt % relative to 100 wt % of the combination of the water and the fuel oil.

According to this disclosure, the fuel composition may further include hydrogen gas, which is effective in improving fuel efficiency. In certain embodiments, the concentration of the hydrogen gas ranges from 5 ppm to 10 ppm.

In certain embodiments, the fuel composition may be subjected to an oscillation treatment using, e.g., high frequency, electromagnetic wave or ultrasonic wave, so as to disperse the molecular aggregates of the fuel oil and the water, thereby improving fuel efficiency.

The remodeled diesel engine includes a cylinder unit defining a combustion chamber, and a coating coated on the cylinder unit and facing the combustion chamber (i.e., coated on an inner surface of the cylinder unit).

Examples of the remodeled diesel engine suitable for use in this disclosure may include, but are not limited to, an internal combustion diesel engine (such as the engine used in a vehicle, a diesel generator, etc.), an external combustion diesel engine (such as a boiler, a furnace, a turbine for generating work and electricity), and a diesel oil boiler for generating hot steam to keep warm).

In an exemplary embodiment, an internal combustion diesel engine serving as an example of the remodeled diesel engine is used. Referring to FIG. 1, the embodiment of the internal combustion diesel engine includes a cylinder unit 1 defining a combustion chamber 3, and a coating 2 coated on the cylinder unit 1 and facing the combustion chamber 3 (i.e., coated on an inner surface of the cylinder unit 1).

The coating 2 contains a catalyst, e.g., a metal, an alloy of the metal, a composite containing oxides of the metal, a salt of the metal or combinations thereof. Examples of the metal include platinum, nickel, cobalt, copper, molybdenum, titanium and combinations thereof.

As used herein, the term "the alloy of the metal" refers to an alloy containing platinum, nickel, cobalt, copper, molybdenum and/or titanium. Examples of the alloy containing the metal suitable for use in this disclosure include, but are not limited to, a nickel-cobalt alloy, a nickel-copper alloy, a nickel-titanium alloy and combinations thereof.

As used herein, the term "the composite containing oxides of the metal" refers to a composite containing platinum oxides, nickel oxides, cobalt oxides, copper oxides, molybdenum oxides and/or titanium oxides. Examples of the composite containing oxides of the metal suitable for use in this disclosure include, but are not limited to, a composite containing nickel oxides and cobalt oxides.

As used herein, the term "the salt of the metal" refers to a platinum salt, a nickel salt, a cobalt salt, a copper salt, a molybdenum salt and/or a titanium salt, which may be capable of serving as a catalyst. According to this disclosure, the salt of the metal may be an oxide of the metal, a sulfide of the metal or the combination thereof. A non-limiting example of the oxide of the metal is nickel monoxide. A non-limiting example of the sulfide of the metal is nickel sulfide.

In certain embodiments, the coating 2 further contains sulfate ions. The sulfate ions may be coated on the cylinder unit 1 by any suitable method, such as spraying coating, sputtering coating and burning of sulfur-containing components in the fuel oil to generate metal sulfates that is deposited on the cylinder unit 1.

In this embodiment, the cylinder unit 1 includes a cylinder 11, a cylinder head 12 and a piston 13. The cylinder head 12 seals a top end of the cylinder 11. The piston 13 is reciprocally movably mounted in the cylinder 11, is spaced apart from the cylinder head 12 and seals a bottom end of the cylinder 11. The cylinder 11, the cylinder head 12 and the piston 13 cooperatively define the combustion chamber 3.

Each of the cylinder 11, the cylinder head 12 and the piston 13 has a respective interior surface 110, 120, 130 facing the combustion chamber 3, which are parts of the inner surface of the cylinder unit 1.

In this embodiment, the coating 2 is coated on the interior surface 120 of the cylinder head 12. It should be noted that, the position of the coating 2 is not limited to what is disclosed in this embodiment, and may vary so as to meet actual requirements. For example, the coating 2 may be coated on at least one of the interior surfaces 110, 120, 130 of the cylinder 11, the cylinder head 12 and the piston 13.

The cylinder head 12 includes an intake valve 121 that is openable for introducing a flow of an external air into the combustion chamber 3, a fuel injection nozzle 122 for supplying the fuel composition to the combustion chamber 3, and an exhaust valve 123 that is openable to permit exhaust gases to leave the combustion chamber 3.

The combustion engine may be operated in a four-stroke cycle:
(1) Intake: The exhaust valve 123 is closed and the intake valve 121 is open. At the same time, the piston 13 is sliding downwardly away from cylinder head 12 (i.e., from a top dead center to a bottom dead center) so as to introduce a flow of the external air into the combustion chamber 3 through the intake valve 121.
(2) Compression: Both the intake and exhaust valves 121, 123 are closed during this stage. The piston 13 is sliding upwardly from the bottom dead center to the top dead center, so as to compress the air in the combustion chamber 3.
(3) Combustion/explosion: The fuel composition is injected from the fuel injection nozzle 122 into the combustion chamber 3, and then ignited by heat, which is generated by high compression. At this stage, the pressure in the combustion chamber 3 is not lower than 100 atm, and the temperature is not lower than 2000° C. The combustion gases thus produced forcefully return the piston 13 to the bottom dead center (i.e., away from the cylinder head 22), thereby producing kinetic energy.
(4) Exhaust (emission): The piston 3 returns from the bottom dead center to the top dead center while the exhaust valve 123 opens. The combustion gases are expelled outside of the combustion chamber 3 through the exhaust valve 123.

Without wishing to be bound by any theory, it is believed that, during the combustion stage, the fuel composition of this disclosure may produce hydrogen and oxygen gases through redox reaction which is catalyzed by the catalyst of the coating 2 coated on the cylinder unit 1. Meanwhile, the toxic $NO_x$ and HC resulted from the incomplete combustion of the fuel composition are converted into harmless nitrogen gas, oxygen gas, water and carbon dioxide. In addition, PM may react with hot steam (produced by the combustion of the water from the fuel composition) at a high temperature (i.e., through syngas reaction) to form carbon dioxide and hydrogen gas. As such, the amount of these pollutants ($NO_x$, HC and PM) in the combustion gas may be greatly reduced. The fuel oil in the fuel composition may also be almost completely burnt to release a powerful, explosive force and a large amount of heat, so as to greatly reduce the fuel consumption without lowering the shaft torque under the same engine rotation speed, thereby improving the fuel efficiency.

The disclosure will be further described by way of the following examples and comparative example. However, it should be understood that the following examples and comparative example are solely intended for the purpose of illustration and should not be construed as limiting the disclosure in practice.

EXAMPLES

Example

A fuel composition serving as a fuel, which is prepared by mixing water, a light oil and an emulsifying agent (i.e., amphiphilic compound having high basicity) at a weight ratio of 30:70:1, was added into an internal combustion diesel engine as shown in FIG. 1, in which the catalyst of the coating 2 is nickel.

The internal combustion diesel engine filled with the fuel composition was subjected to an operation test using a motor vehicle having a four-speed engine transmission at an engine rotation speed of 2000 rpm and an engine load factor of 60%. The residual amounts of $NO_x$ and HC in the combustion gas, a shaft torque (kgf·m) and an average fuel consumption (L/hour) were determined. The lower the average fuel consumption is, the higher the fuel efficiency is.

COMPARATIVE EXAMPLE

The Comparative example was conducted similarly as the Example, except that the light oil serves as the fuel of the internal combustion diesel engine.

Results

The obtained results for the Example and the Comparative example are shown in Table 1.

TABLE 1

| | Example | Comparative example |
|---|---|---|
| Residual amount of $NO_x$ (ppm) | 74 | 135 |
| Residual amount of HC (ppm) | 0 | 9 |
| Shaft torque (kgf · m) | 23 | 22 |
| Average fuel consumption (L/hour) | 0.85 | 5.8 |

It can be seen from Table 1 that, as compared to the Comparative example, the Example, which uses the fuel composition as a fuel of the combustion engine, produces less pollutant (such as $NO_x$ and HC), and exhibits a lower fuel consumption (i.e., higher fuel efficiency) at a similar shaft torque and the same engine rotation speed. This indicates that the fuel composition of this disclosure, which is composed of water, a fuel oil and an emulsifying agent, is capable of improving performance of a remodeled diesel engine with a catalyst (such as Ni) coated on a cylinder unit thereof.

In the description above, for the purposes of explanation, numerous specific details have been set forth in order to provide a thorough understanding of the embodiment(s). It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, FIGURE, or description thereof for the purpose of streamlining the disclosure and aiding in the understanding of various inventive aspects, and that one or more features or specific details from one embodiment may be practiced together with one or more features or specific details from another embodiment, where appropriate, in the practice of the disclosure.

While the disclosure has been described in connection with what is considered the exemplary embodiment, it is understood that this disclosure is not limited to the disclosed embodiment but is intended to cover various arrangements included within the spirit and scope of the broadest interpretation so as to encompass all such modifications and equivalent arrangements.

What is claimed is:

1. A method of improving fuel efficiency of a remodeled diesel engine, comprising applying a fuel composition to the remodeled diesel engine, wherein:

the fuel composition is composed of water, a fuel oil and an emulsifying agent, the amount of water ranging from 10 wt % to 90 wt % based on 100 wt % of the combination of the water and the fuel oil and the amount of the emulsifying agent ranging from 0.5 wt % to 10 wt % relative to 100 wt % of the combination of the water and the fuel oil, the emulsifying agent being one of an amphiphilic compound, a mixture of a lipophilic compound and a hydrophilic compound, and a combination thereof, wherein the amphiphilic compound includes an organic base having a base function group and a C3 to C20 alkyl group, the lipophilic compound includes sorbitan ester, and the hydrophilic compound includes polysorbate;

the remodeled diesel engine comprises a cylinder unit and a combustion chamber defined by the cylinder unit, the cylinder unit having an inner surface facing the combustion chamber, a catalyst being coated on the inner surface and being selected from the group consisting of a metal, an alloy of the metal, a composite containing oxides of the metal, a salt of the metal and combinations thereof, the metal being selected from the group consisting of platinum, nickel, cobalt, copper, molybdenum, titanium and combinations thereof.

2. The method as claimed in claim 1, wherein the salt of the metal is selected from the group consisting of: an oxide of the metal, a sulfide of the metal and the combination thereof.

3. The method as claimed in claim 1, wherein the alloy of the metal is selected from the group consisting of a nickel-cobalt alloy, a nickel-copper alloy, a nickel-titanium alloy and combinations thereof.

4. The method as claimed in claim 1, wherein sulfate ions are further coated on the inner surface of the cylinder unit.

5. The method as claimed in claim 1, wherein the water is present in an amount ranging from 10 wt % to 50 wt % based on 100 wt % of the combination of the water and the fuel oil.

6. The method as claimed in claim 1, wherein the remodeled diesel engine is an internal combustion diesel engine, and the cylinder unit includes a cylinder, a cylinder head that seals a top end of the cylinder, and a piston that is disposed within the cylinder and spaced apart from the cylinder head and that seals the bottom end of the cylinder, the cylinder, the cylinder head and the piston cooperatively defining the combustion chamber, each of which having an interior surface facing the combustion chamber, wherein the catalyst is coated on the interior surface of at least one of the cylinder, the cylinder head and the piston.

* * * * *